(12) United States Patent
Hadano et al.

(10) Patent No.: US 11,731,485 B2
(45) Date of Patent: Aug. 22, 2023

(54) CONTROL SYSTEM OF MANUAL-TYPE AIR CONDITIONER FOR VEHICLE

(71) Applicants: TOYOTA JIDOSHA KABUSHIKI KAISHA, Aichi-ken (JP); DENSO CORPORATION, Aichi-pref (JP)

(72) Inventors: Hiroyasu Hadano, Toyota (JP); Kunihiro Murakami, Okazaki (JP); Takaaki Inokuchi, Nagoya (JP); Asuka Marumo, Kariya (JP)

(73) Assignees: TOYOTA JIDOSHA KABUSHIKI KAISHA, Aichi-ken (JP); DENSO CORPORATION, Aichi-pref (JP)

(*) Notice: Subject to any disclaimer, the term of this patent is extended or adjusted under 35 U.S.C. 154(b) by 0 days.

(21) Appl. No.: 17/673,676

(22) Filed: Feb. 16, 2022

(65) Prior Publication Data
US 2022/0258563 A1     Aug. 18, 2022

(30) Foreign Application Priority Data
Feb. 17, 2021  (JP) ................... 2021-023576

(51) Int. Cl.
*B60H 1/00* (2006.01)
*B60H 1/22* (2006.01)
(Continued)

(52) U.S. Cl.
CPC ......... *B60H 1/00657* (2013.01); *B60H 1/004* (2013.01); *B60H 1/00742* (2013.01);
(Continued)

(58) Field of Classification Search
CPC ............... B60H 1/00657; B60H 1/004; B60H 1/00742; B60H 1/00778; B60H 1/2218;
(Continued)

(56) References Cited

U.S. PATENT DOCUMENTS

2012/0142264 A1*  6/2012  Sagou ............... B60H 1/00842
                                                      454/75
2015/0099443 A1  4/2015  Hirabayashi et al.
(Continued)

FOREIGN PATENT DOCUMENTS

JP         201574236 A      4/2015

*Primary Examiner* — Marc E Norman
*Assistant Examiner* — Matthew John Moscola
(74) *Attorney, Agent, or Firm* — Hauptman Ham, LLP

(57) ABSTRACT

A control system includes a manual-type air conditioner, and a control device which causes the manual-type air conditioner to execute remote air conditioning in response to a command from outside of a vehicle. The control device starts actuation of the manual-type air conditioner with a maximum temperature as a target blowout temperature of an air-conditioning air and a maximum air quantity as a target air quantity in response to a trigger command of the remote air conditioning, and gradually changes and reduces the target air quantity while gradually changing the target blowout temperature toward a target intermediate temperature with elapse of time. The control device changes the target blowout temperature and the target air quantity respectively to a set blowout temperature and a set air quantity at a time of previous disembarkment, when boarding of a user to the vehicle is detected.

2 Claims, 4 Drawing Sheets

(51) Int. Cl.
*B60H 1/24* (2006.01)
*B60H 1/32* (2006.01)

(52) U.S. Cl.
CPC ....... *B60H 1/00778* (2013.01); *B60H 1/2218* (2013.01); *B60H 1/24* (2013.01); *B60H 1/32* (2013.01); *B60H 2001/2234* (2013.01)

(58) Field of Classification Search
CPC .... B60H 1/24; B60H 1/32; B60H 2001/2234; B60H 1/00892
See application file for complete search history.

(56) References Cited

U.S. PATENT DOCUMENTS

| | | | |
|---|---|---|---|
| 2017/0326944 A1* | 11/2017 | Carlesimo | B60H 1/00778 |
| 2019/0176752 A1* | 6/2019 | Cermak | B60R 25/209 |
| 2021/0008959 A1* | 1/2021 | Lee | B60H 1/00978 |
| 2022/0371401 A1* | 11/2022 | Roth | B60H 1/00735 |

* cited by examiner

CONTROL SYSTEM OF MANUAL-TYPE AIR CONDITIONER FOR VEHICLE

CROSS REFERENCE TO RELATED APPLICATION

This application claims priority to Japanese Patent Application No. 2021-23576 filed on Feb. 17, 2021, which is incorporated herein by reference in its entirety including the specification, claims, drawings, and abstract.

TECHNICAL FIELD

The present disclosure relates to a control system of a manual-type air conditioner for a vehicle, and in particular to suppression of energy consumption during execution of remote air conditioning and realization of a comfortable air-conditioning state when a user boards a vehicle.

BACKGROUND

JP 2015-74236 A discloses a system in which a user operates an electronic key of a remote control in a state in which the user is positioned outside of a vehicle, to cause a controller in the vehicle to control an air-conditioning device and to thereby execute remote air conditioning. In this system, when execution of the remote air conditioning is commanded, if an air temperature outside of the vehicle is lower than an air temperature inside a vehicle cabin, a ventilation operation is executed, and, on the other hand, if the air temperature outside of the vehicle is higher than the air temperature inside the vehicle cabin, an air cooling operation is executed.

In a manual-type air conditioner for a vehicle, a blowout temperature and an air quantity of an air-conditioning air from a blowout outlet are manually adjusted by the user operating an operation unit in the vehicle cabin. In the manual-type air conditioner, no temperature sensor for sensing the temperature in the vehicle cabin is provided, and the temperature in the vehicle cabin is not automatically adjusted. Thus, with a trigger command of the remote air conditioning, the air conditioning device is actuated with the set blowout temperature and set air quantity corresponding to operation positions at the time of previous disembarkment of the user.

However, when the remote air conditioning is to be executed by the manual-type air conditioner for vehicle, if the set blowout temperature and the set air quantity of weak air cooling or air heating at the time of disembarkment of the user are utilized, there may be cases in which the user feels air cooling insufficiency or air heating insufficiency in the vehicle cabin when the user boards the vehicle. On the other hand, if there is employed a configuration in which, at the time of the remote air conditioning, the blowout temperature and the air quantity are forcibly changed to the maximum settings, and this state is maintained, energy is wastefully consumed. Further, if there is employed a configuration in which the blowout temperature and the air quantity at the time of the remote air conditioning are maintained at an intermediate temperature and an intermediate air quantity, there may be cases in which a comfortable in-vehicle cabin temperature cannot be realized during boarding of the user, as there is a possibility that the time from the start of the remote air conditioning is short.

An advantage of the present disclosure lies in realization of a comfortable air-conditioning state when a user boards a vehicle while suppressing energy consumption during execution of the remote air conditioning in a control system of a manual-type air conditioner for a vehicle.

SUMMARY

According to one aspect of the present disclosure, there is provided a control system of a manual-type air conditioner for a vehicle, the control system comprising: a manual-type air conditioner in which a blowout temperature and an air quantity of an air-conditioning air from a blowout outlet are manually adjusted by an operation of an operation unit in a vehicle cabin by a user; and a control device that causes the manual-type air conditioner to execute remote air conditioning in response to a command from outside of the vehicle in a state in which the user is not boarding the vehicle, wherein the control device starts actuation of the manual-type air conditioner with a maximum temperature as a target blowout temperature of the air-conditioning air and a maximum air quantity as a target air quantity of the air-conditioning air in response to a trigger command of the remote air conditioning, gradually changes and reduces the target air quantity while gradually changing the target blowout temperature toward a target intermediate temperature with elapse of time, and changes the target blowout temperature and the target air quantity respectively to a set blowout temperature and a set air quantity at a time of previous disembarkment, when boarding of the user is detected.

According to the structure described above, unlike the case in which the set blowout temperature and the set air quantity of the weak air-cooling or air-heating are maintained in the remote air conditioning, it is possible to prevent the user from feeling air-cooling insufficiency or air-heating insufficiency of the vehicle cabin when the user boards the vehicle. In addition, during the remote air conditioning, the target air quantity is gradually changed and reduced while the target blowout temperature is gradually changed from the maximum temperature toward the target intermediate temperature. The target intermediate temperature may be set to a predetermined temperature such as 25° C., which can be considered to be most comfortable for many people. Even when the most comfortable temperature differs among the users, a user's comfortable temperature is normally closer to the target intermediate temperature than to the maximum temperature. With this configuration, it becomes easier to quickly realize a comfortable in-vehicle cabin temperature at the time of boarding of the user while suppressing energy consumption. Further, because the target blowout temperature and the target air quantity at the time of boarding of the user are set to the set blowout temperature and the set air quantity at the time of previous disembarkment, it becomes easier to reflect the setting of the air conditioning close to the current time and to realize a comfortable air-conditioning state corresponding to the user's preferences.

In the control system of the manual-type air conditioner for the vehicle according to the present disclosure, there may be employed a configuration in which degrees of gradual changes of the target blowout temperature and the target air quantity during the remote air conditioning are changed according to a detection value of at least one sensor of an outside air temperature sensor, or a solar radiation sensor which detects an intensity of solar radiation in the vehicle cabin.

According to the structure described above, the degrees of the gradual changes of the target blowout temperature and the target air quantity may be increased when the temperature in the vehicle cabin tends to change, based on at least one of the outside air temperature and the solar radiation intensity, and the degrees of the gradual changes of the target blowout temperature and the target air quantity may be reduced when the temperature in the vehicle cabin tends to not change, so that it becomes easier to realize a comfortable in-vehicle cabin temperature more efficiently at the time of boarding of the user.

According to the control system of the manual-type air conditioner for vehicle according to the present disclosure, a comfortable air-conditioning state may be realized at the time of boarding of the user while suppressing energy consumption during execution of the remote air conditioning.

BRIEF DESCRIPTION OF DRAWINGS

Embodiment(s) of the present disclosure will be described based on the following figures, wherein.

DESCRIPTION OF EMBODIMENTS

Figure 1:
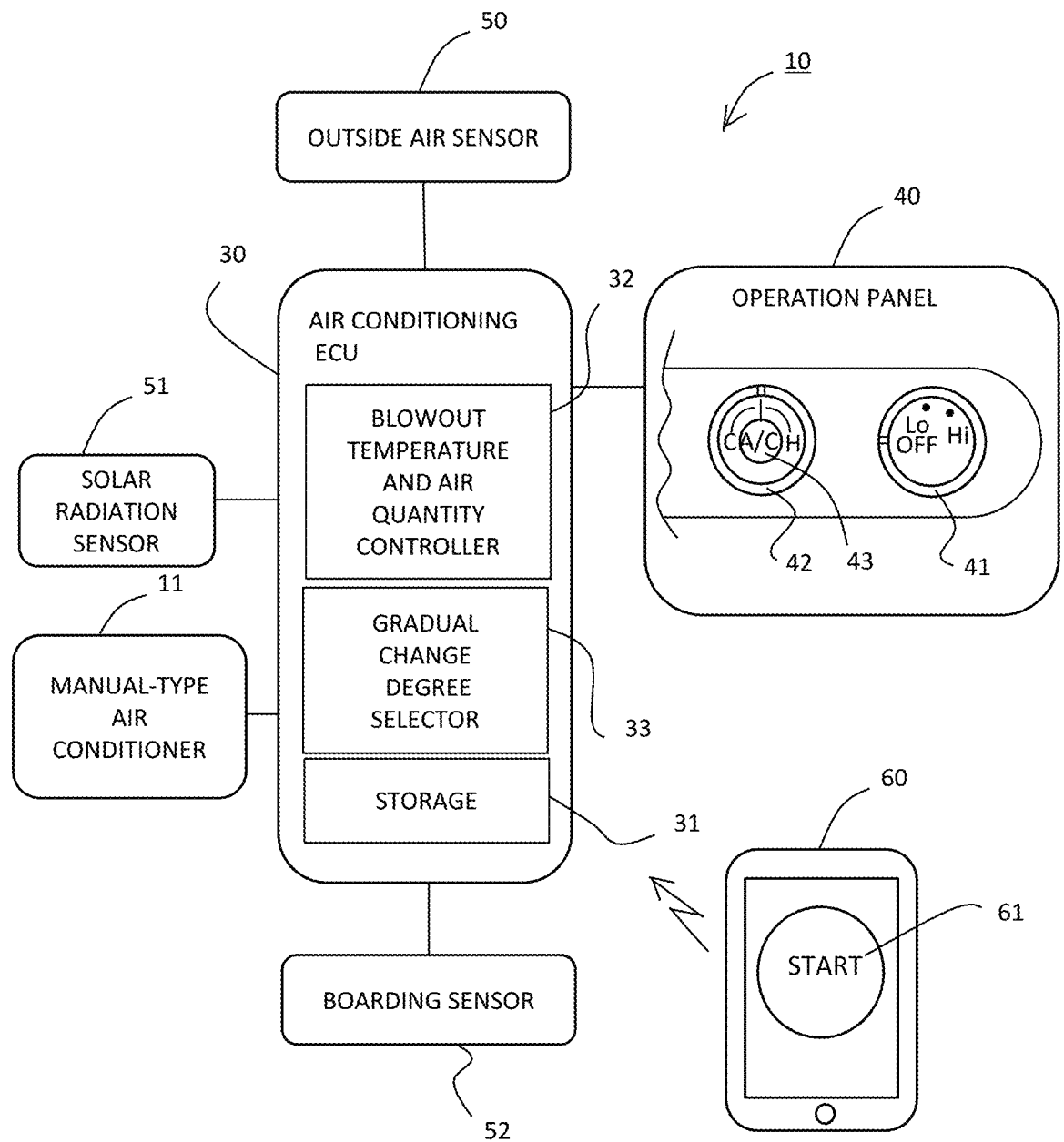
FIG. 1 is a structural diagram of a control system of a manual-type air conditioner for a vehicle according to an embodiment of the present disclosure.

An embodiment of the present disclosure will now be described in detail with reference to the drawings. A shape, a numerical value, a placement relationship, a control process, and the like described below are merely exemplary for the purpose of description, and may be changed according to a specification of a control system of a manual-type air conditioner for a vehicle. In the following description, similar constituting elements are assigned similar reference numerals. The control system of the manual-type air conditioner for a vehicle according to an embodiment of the present disclosure may be applied to any of an engine vehicle which is driven with only an engine as a driving source, an electrically-driven vehicle which is driven with only an electric motor as a driving source, and a hybrid electric vehicle which is driven with the engine and the electric motor as a driving source.

Figure 3:
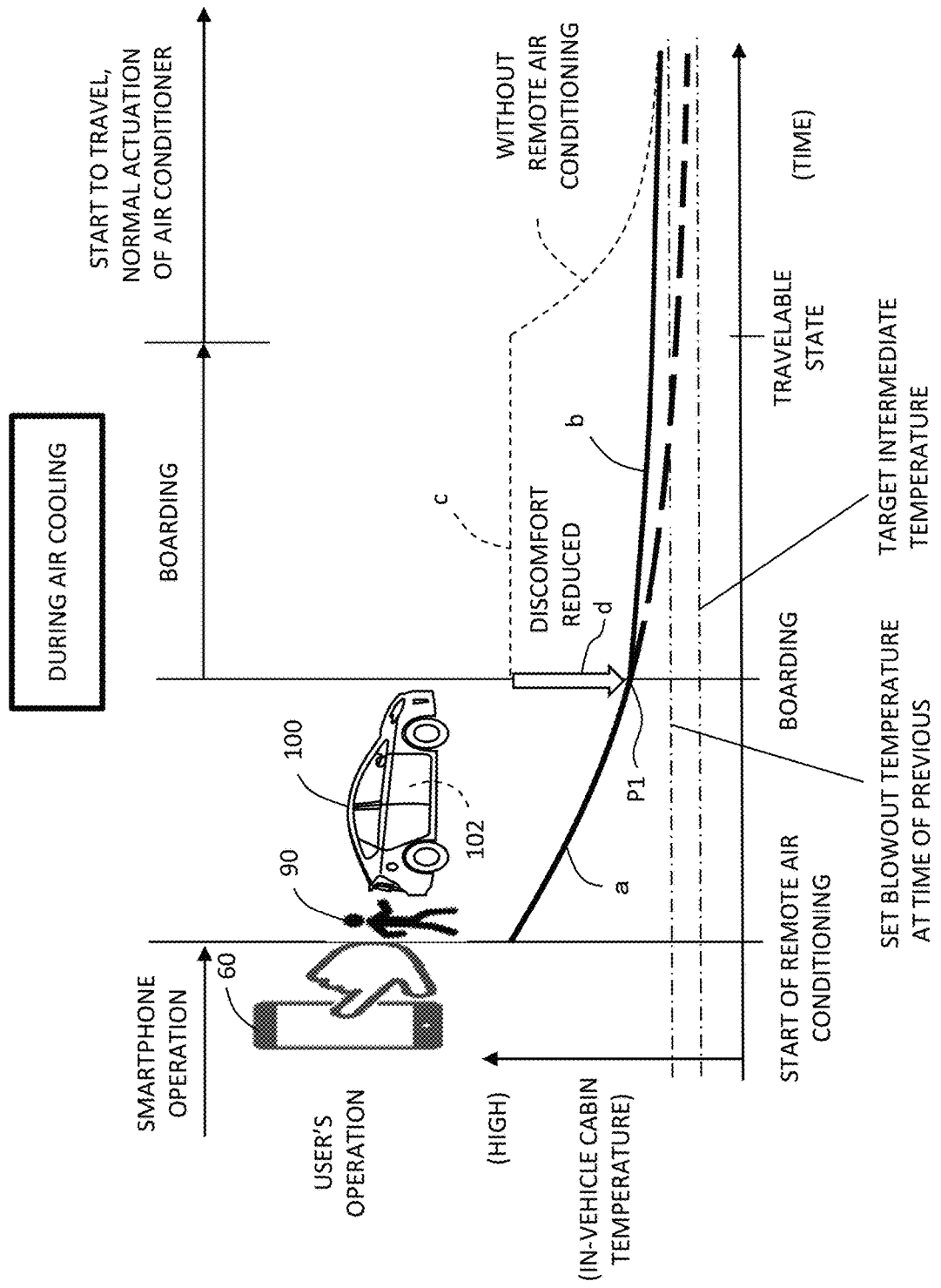
FIG. 3 is a diagram showing an effect of remote air conditioning during air cooling according to an embodiment of the present disclosure, in a relationship between an in-vehicle cabin temperature and time.

A control system 10 of a manual-type air conditioner for a vehicle will now be described with reference to FIG. 1. The control system 10 comprises a manual-type air conditioner 11, an air conditioning control device (air-conditioning ECU) 30, an operation panel 40, an outside air temperature sensor 50, a solar radiation sensor 51, a boarding sensor 52, and a smartphone 60. The air conditioning control device 30 controls the manual-type air conditioner 11 by a user 90 (FIG. 3) operating an operation unit of the operation panel 40 provided in a vehicle cabin 102 of a vehicle 100 (FIG. 3). With this process, in the manual-type air conditioner 11, an air-conditioning air in which a blowout temperature and an air quantity are manually adjusted is blown out from a blowout outlet provided in the vehicle cabin 102.

While the details of the manual-type air conditioner 11 are not shown in the drawings, the manual-type air conditioner 11 is provided in the vehicle 100, takes in, with a blower placed in a duct, one or both of air outside of the vehicle and air in the vehicle cabin into the duct, and causes the air to flow to a downstream side. At the downstream side of the blower, an air cooling unit and an air heating unit are placed, and a temperature is adjusted by adjusting a mixture ratio of air passing through the air cooling unit and air passing through the air heating unit, by an operation of an air mixing door. The air-conditioning air whose temperature is adjusted is blown out from the blowout outlet in the vehicle cabin.

The air conditioning control device 30 comprises a calculation processor formed from, for example, a PCU, and a storage 31 such as a RAM, a ROM, or the like. The air conditioning control device 30 actuates the manual-type air conditioner 11 based on a manual operation of the operation unit of the operation panel 40 by the user 90 in a state in which the user 90 boards the vehicle. Further, the air conditioning control device 30 causes the manual-type air conditioner 11 to execute remote air conditioning in response to a command from outside of the vehicle using the smartphone 60 in a state in which the user 90 is not boarding the vehicle.

The storage 31 of the air conditioning control device 30 stores a set blowout temperature and a set air quantity at the time of previous disembarkment, as will be described later. For example, when an ignition switch of the vehicle or a startup switch such as a startup button is switched OFF, the set blowout temperature and the set air quantity which are set by the operation of the operation unit of the operation panel 40 by the user are stored in the storage 31. The set blowout temperature and the set air quantity are used to cause a target blowout temperature and a target air quantity of the air-conditioning air to return to the set temperature and the set air quantity when boarding of the user 90 is detected during remote air conditioning.

The air conditioning control device 30 further comprises a blowout temperature and air quantity controller 32 and a gradual change degree selector 33. The blowout temperature and air quantity controller 32 controls the blower of the manual-type air conditioner 11 and an actuator for the air mixing door, to cause the air-conditioning air having a blowout temperature which is set and an air quantity which is set as target values to be blown out from the blowout outlet. The gradual change degree selector 33 selects gradual change degrees of the target blowout temperature and the target air quantity used during the remote air conditioning, based on detection values of the outside air temperature sensor 50 and the solar radiation sensor 51 to be described later. With this process, it becomes easier to realize a comfortable in-vehicle cabin temperature more efficiently at the time of boarding of the user 90.

The operation panel 40 is placed near an instrument panel at a front part in the vehicle cabin 102. On the operation panel 40, there are provided an air quantity adjustment switch 41 for setting a target air quantity of the blower of the manual-type air conditioner 11, a temperature adjustment switch 42 for setting a target blowout temperature of the air-conditioning air blown out from the blowout outlet, and an A/C ON/OFF switch 43 which switches ON and OFF a compressor of the manual-type air conditioner 11. The switches 41, 42, and 43 of the operation panel 40 correspond to an operation unit. When one or a plurality of the switches of the operation panel 40 is/are operated to set a blowout state of the air-conditioning air from the blowout outlet, the air conditioning control device 30 controls various drive units such as the blower of the manual-type air conditioner 11, the actuator for driving the air mixing door, or the like, based on the setting state. With this process, an air-conditioning air adjusted to a desired temperature and in a desired air quantity is blown out from the blowout outlet. For example, when the highest temperature is set by the operation of the temperature adjustment switch 42, all of the air flowing at the downstream side of the blower in the duct is caused to pass through the air heating unit, by a movement of the air mixing door, and is then blown out from the blowout outlet. In this process, the actuation of the air cooling unit is stopped. On the other hand, when the lowest temperature is set by the operation of the temperature adjustment switch 42, all of the air flowing at the downstream side of the blower in the duct is caused to pass through the air cooling unit and to not pass through the air heating unit, by a movement of the air mixing door, and the air cooling unit is actuated.

The outside air temperature sensor 50 detects an outside air temperature of the vehicle 100. The solar radiation sensor 51 is placed near a front window or the like in the vehicle cabin 102, and detects an intensity of the solar radiation in the vehicle cabin 102. The boarding sensor 52 detects boarding of the user 90 onto the vehicle 100. For example, the boarding sensor 52 is formed from a door lock sensor, and judges that the user 90 has boarded the vehicle when a door at a driver seat is unlocked and is then locked. Alternatively, the boarding sensor 52 may be formed from a door open/close sensor, and may judge that the user 90 has boarded the vehicle when the door at the driver seat is changed from a closed state to an opened state. Alternatively, the boarding sensor 52 may be formed from a seating sensor that detects that the user 90 is seated on the driver seat, and may judge that the user 90 has boarded the vehicle when the seating is detected. Detection signals of the outside air temperature sensor 50, the solar radiation sensor 51, and the boarding sensor 52 are output to the air conditioning control device 30.

The smartphone 60 is a remote operation device with which the user 90 commands the remote air conditioning by a remote operation before boarding the vehicle. For example, an application program for commanding the remote air conditioning is installed in advance in the smartphone 60. When the user 90 activates the application program, the program is executed. In this case, for example, an image of a start button 61 as shown in FIG. 1 is displayed on a display screen of the smartphone 60. When the user touches the start button 61, a trigger signal indicating a trigger command of the remote air conditioning is transmitted to the air conditioning control device 30 of the vehicle 100. For example, the trigger signal is transmitted from the smartphone 60 to the vehicle 100 as a wireless signal of a standard such as the WiFi standard, and the air conditioning control device 30 actuates the manual-type air conditioner 11 based on the trigger signal. Alternatively, the remote operation device may be a portable information terminal other than the smartphone 60 such as a tablet terminal or the like, an electronic key, a remote control dedicated for commanding the remote air conditioning, or the like.

The blowout temperature and air quantity controller 32 of the air conditioning control device 30 executes a post-gradual change return control according to the trigger command of the remote air conditioning by the smartphone 60 or the like. In the post-gradual change return control, first, the blowout temperature and air quantity controller 32 starts the actuation of the manual-type air conditioner 11 with the target blowout temperature of the air-conditioning air blown out from the blowout outlet being the maximum temperature and the target air quantity of the air-conditioning air being the maximum air quantity. The "maximum temperature" means either the highest temperature at the time of air heating or the lowest temperature at the time of air cooling, and is a target temperature which is set when the temperature adjustment switch 42 shown in FIG. 1 is operated to a position of "C" or to a position of "H". The blowout temperature and air quantity controller 32 decides whether to set the maximum temperature to the highest temperature or to the lowest temperature according to the detection value of the outside air temperature. More specifically, when it is hot and the detection value of the outside air temperature is higher than a predetermined temperature such as, for example, 25° C., the blowout temperature and air quantity controller 32 judges that air cooling is requested by the user 90, and sets the target blowout temperature of the air-conditioning air to the lowest temperature. On the other hand, when it is cool or cold, and the outside air temperature is lower than or equal to the predetermined temperature, the blowout temperature and air quantity controller 32 judges that air heating is requested by the user 90, and sets the target blowout temperature of the air-conditioning air to the highest temperature.

Then, the blowout temperature and air quantity controller 32 gradually changes and reduces the target air quantity toward the smallest air quantity during remote air conditioning while gradually changing the target blowout temperature toward a target intermediate temperature with elapse of time. The "target intermediate temperature" may be set to a predetermined temperature which is a temperature considered to be most comfortable for many people, for example, 25° C., and is stored in the storage 31 of the air conditioning control device 30 in advance. In this manner, from the state in which, at the start of the remote air conditioning, the target blowout temperature is set to the maximum temperature and the target air quantity is set to the maximum air quantity, the target air quantity is gradually changed and reduced while the target blowout temperature is gradually changed toward the target intermediate temperature. Thus, the temperature in the vehicle cabin 102 can be quickly made closer to a comfortable temperature while suppressing energy consumption. The smallest air quantity during remote air conditioning is, for example, a predetermined intermediate air quantity. When the target air quantity of the air-conditioning air reaches the smallest air quantity during remote air conditioning, the target air quantity is maintained in this state until the boarding of a passenger to the vehicle is detected. When the target blowout temperature of the air-conditioning air reaches the target intermediate temperature, the target blowout temperature is maintained in this state until the boarding of a passenger to the vehicle is detected.

When the boarding of the user 90 to the vehicle is detected, the blowout temperature and air quantity controller 32 changes the target blowout temperature and the target air quantity to the set blowout temperature and set air quantity which are set by the operation of the user 90 at the time of previous disembarkment. With this process, it becomes easier to realize a comfortable air conditioning state corresponding to the preferences of the user 90.

The gradual change degree selector 33 of the air conditioning control device 30 changes degrees of gradual changes per a predetermined period when the target air quantity is gradually changed and reduced while the target blowout temperature is gradually changed toward the target intermediate temperature, based on detection values of the outside air temperature sensor 50 and the solar radiation sensor 51. With this process, the degrees of the gradual changes of the target blowout temperature and the target air quantity are increased when the temperature in the vehicle cabin 102 tends to change, indicated by the outside air temperature and the solar radiation intensity. In addition, the degrees of gradual changes of the target blowout temperature and the target air quantity are reduced when the temperature in the vehicle cabin 102 does not tend to change, indicated by the outside air temperature and the solar radiation intensity. With this process, it becomes easier to efficiently realize a comfortable in-vehicle cabin temperature at the time of boarding of the user 90 to the vehicle, in combination with the changes of the degrees of gradual changes using both the outside air temperature and the solar radiation intensity. Alternatively, the air conditioning control device 30 may have a structure in which the degrees of the gradual changes are changed according to the detection value of one of the outside air temperature sensor 50 and the solar radiation sensor 51. Alternatively, the gradual change degree selector may be omitted from the air conditioning control device 30, and the degrees of gradual changes of the target blowout temperature and the target air quantity may be set to predetermined values which are set in advance, regardless of the outside air temperature and the solar radiation intensity.

Figure 2:
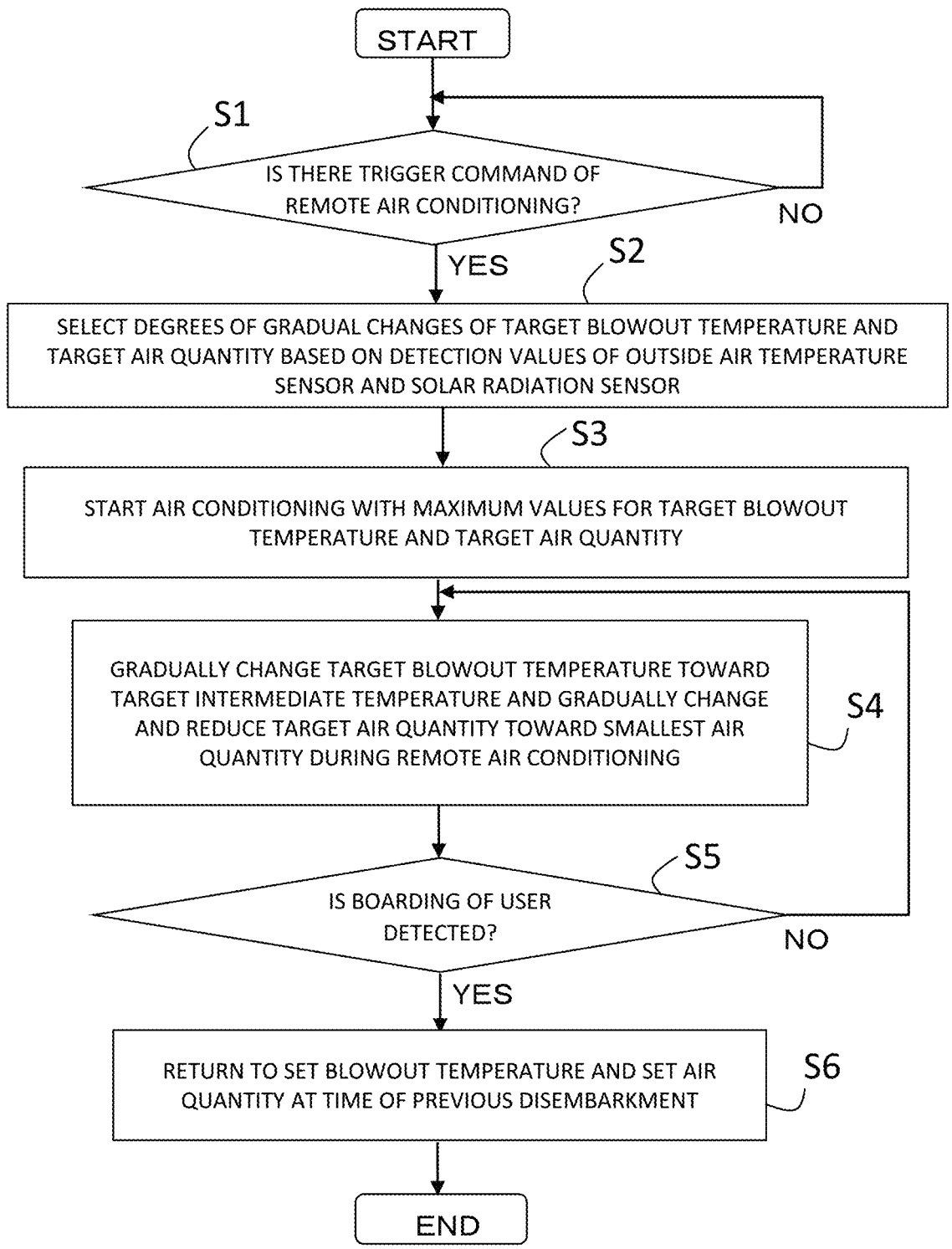
FIG. 2 is a flowchart showing a control method of remote air conditioning in an embodiment of the present disclosure.

A control method of the remote air conditioning by the air conditioning control device 30 will now be described with reference to a flowchart of FIG. 2. First, in step S1 of FIG. 2, it is judged whether or not there is a trigger command of the remote air conditioning by an operation of the smartphone 60. When a result of judgment in step S1 is positive (YES); that is, when it is judged that there is a trigger command, the process proceeds to step S2. When the judgment result in step S1 is negative (NO); that is, when it is judged that there is no trigger command, the process returns to step S1.

In step S2, degrees of gradual changes when the target blowout temperature is gradually changed from the maximum temperature and the target air quantity is gradually changed and reduced from the maximum air quantity in the remote air conditioning are set. Specifically, the degrees of gradual changes for the target blowout temperature and the target air quantity are selected based on the detection values of the outside air temperature sensor 50 and the solar radiation sensor 51. For example, during air cooling, when it is hot and at least one of the outside air temperature and the solar radiation intensity is higher than a corresponding predetermined value, because the temperature in the vehicle cabin 102 tends to not change with the actuation of the manual-type air conditioner 11, the degrees of gradual changes of the target blowout temperature and the target air quantity are set low. On the other hand, during air cooling, when both of the outside air temperature and the solar radiation intensity are lower than or equal to corresponding predetermined values, because the temperature in the vehicle cabin 102 tends to change with the actuation of the manual-type air conditioner 11, the degrees of gradual changes of the target blowout temperature and the target air quantity are set high.

In steps S3 to S6, the blower is actuated, to blow out the air-conditioning air from the blowout outlet. In this process, one or both of the air cooling device and the air heating device of the manual-type air conditioner 11 is/are actuated. In step S3, the remote air conditioning is started by actuation of the manual-type air conditioner 11 with the target blowout temperature and the target air quantity set at the maximum values. In this process, in an engine vehicle, the engine is actuated with an idling rotation rate, to drive a power generator and supply a charging electric power of a battery consumed by the actuation of the manual-type air conditioner 11. With the actuation of the engine, a temperature of a heater core for temperature adjustment of the air-conditioning air is increased. Alternatively, the temperature of the heater core may be increased by driving a traveling motor, or an electric heater may be employed as the heater core and the temperature of the heater core may be increased by supplying electric power to the electric heater. In step S4, the manual-type air conditioner 11 is actuated so that the target blowout temperature gradually is changed toward the target intermediate temperature and the target air quantity is gradually changed and reduced toward the smallest air quantity during remote air conditioning. For example, during air cooling, the target blowout temperature is gradually weakened from the lowest temperature toward the target intermediate temperature according to the degree of gradual change selected in step S2; that is, the target blowout temperature is gradually increased. On the other hand, during air heating, the target blowout temperature is gradually weakened from the highest temperature toward the target intermediate temperature according to the degree of gradual change which is selected; that is, the target blowout temperature is gradually reduced. In this manner, unlike the case in which the set blowout temperature and the set air quantity of the weak air cooling or air heating are maintained in the remote air conditioning, it becomes possible to prevent the user 90 from feeling air cooling insufficiency or air heating insufficiency in the vehicle cabin at the time of boarding of the user 90 to the vehicle. Further, as described above, the target intermediate temperature may be set to the predetermined temperature such as 25° C., which may be considered to be the most comfortable for many people, and, even when the most comfortable temperature differs among the users, the comfortable temperature for the user is normally closer to the target intermediate temperature than to the maximum temperature. In this manner, it becomes easier to quickly realize a comfortable in-vehicle cabin temperature at the time of boarding of the user 90 to the vehicle while suppressing the energy consumption.

Next, in step S5, it is judged whether or not boarding of the user 90 to the vehicle is detected based on the detection signal of the boarding sensor 52. When a result of judgment in step S5 is negative (NO); that is, when the boarding to the vehicle is not detected, the process returns to step S4. On the other hand, when the judgment result of step S5 is positive (YES); that is, when the boarding to the vehicle is detected, the target blowout temperature and the target air quantity are changed to return to the set blowout temperature and the set air quantity at the time of previous disembarkment (step S6), and this state is maintained. This state is maintained until the user 90 operates the air quantity adjustment switch 41 or the temperature adjustment switch 42, and the control of the remote air conditioning is completed with an operation of either of these switches. In this manner, because the target blowout temperature and the target air quantity at the time of boarding of the user 90 are respectively set to the set blowout temperature and the set air quantity at the time of previous disembarkment, it becomes easier to reflect the setting of the air conditioning of a period close to the current time and to realize a comfortable air conditioning state corresponding to the user's preferences.

According to the control system 10 of the manual-type air conditioner described above, it becomes possible to prevent the user 90 from feeling air cooling insufficiency or air heating insufficiency of the vehicle cabin 102 when the user 90 boards the vehicle. In addition, it becomes easier to quickly realize a comfortable in-vehicle cabin temperature at the time of boarding of the user 90 to the vehicle while suppressing energy consumption. Further, it becomes easier to realize a comfortable air conditioning state corresponding to the preferences of the user 90. With this configuration, the comfortable air conditioning state at the time of boarding to the user 90 to the vehicle can be realized while suppressing the energy consumption during the execution of the remote air conditioning.

FIG. 3 shows an effect of the remote air conditioning at the time of air cooling in the present embodiment, in a relationship between the in-vehicle cabin temperature and the time. When the user 90 operates the smartphone 60, the trigger command of the remote air conditioning is transmitted to the air conditioning control device 30 and the remote air conditioning is started. With this process, as shown by a solid line a in FIG. 3, the in-vehicle cabin temperature is gradually reduced from a high temperature at the start, converging toward a temperature near the target intermediate temperature. In the case where the user 90 boards the vehicle before the in-vehicle cabin temperature reaches the temperature near the target intermediate temperature, the target blowout temperature and the target air quantity return respectively to the set blowout temperature and the set air quantity at the time of the previous disembarkment. Because of this, as shown by a solid line b in FIG. 3, the in-vehicle cabin temperature changes to converge toward a temperature near the set blowout temperature at the time of previous disembarkment. Thus, solid lines a and b indicating the in-vehicle cabin temperature form a curve with a point P1 at the time of boarding as a point of inflection. In FIG. 3, a case is shown in which the user 90 sets the set blowout temperature to a temperature higher than a center temperature by an operation of the temperature adjustment switch 42 at the time of the previous disembarkment; that is, the setting corresponds to weak air cooling.

On the other hand, a broken line c in FIG. 3 shows a case in which the user 90 does not execute the remote air conditioning before boarding the vehicle. In this case, at the time of boarding of the user 90 to the vehicle, the in-vehicle cabin temperature is high, similar to the time of start of the remote air conditioning shown by the solid line a. In addition, in this case, after the user 90 boards the vehicle, the user 90 causes the manual-type air conditioner 11 to start a normal actuation, different from the remote air conditioning, by setting the vehicle to a travelable state by an operation of the startup switch. From a comparison of the in-vehicle cabin temperatures with and without the remote air conditioning shown in FIG. 3, it can be understood that, with the remote air conditioning, the in-vehicle cabin temperature can be reduced at the time of boarding of the user to the vehicle by a temperature difference shown by a white-filled arrow d, in comparison to the case without the remote air conditioning, and the discomfort of the user 90 at the time of boarding of the vehicle can thus be reduced.

Figure 4:
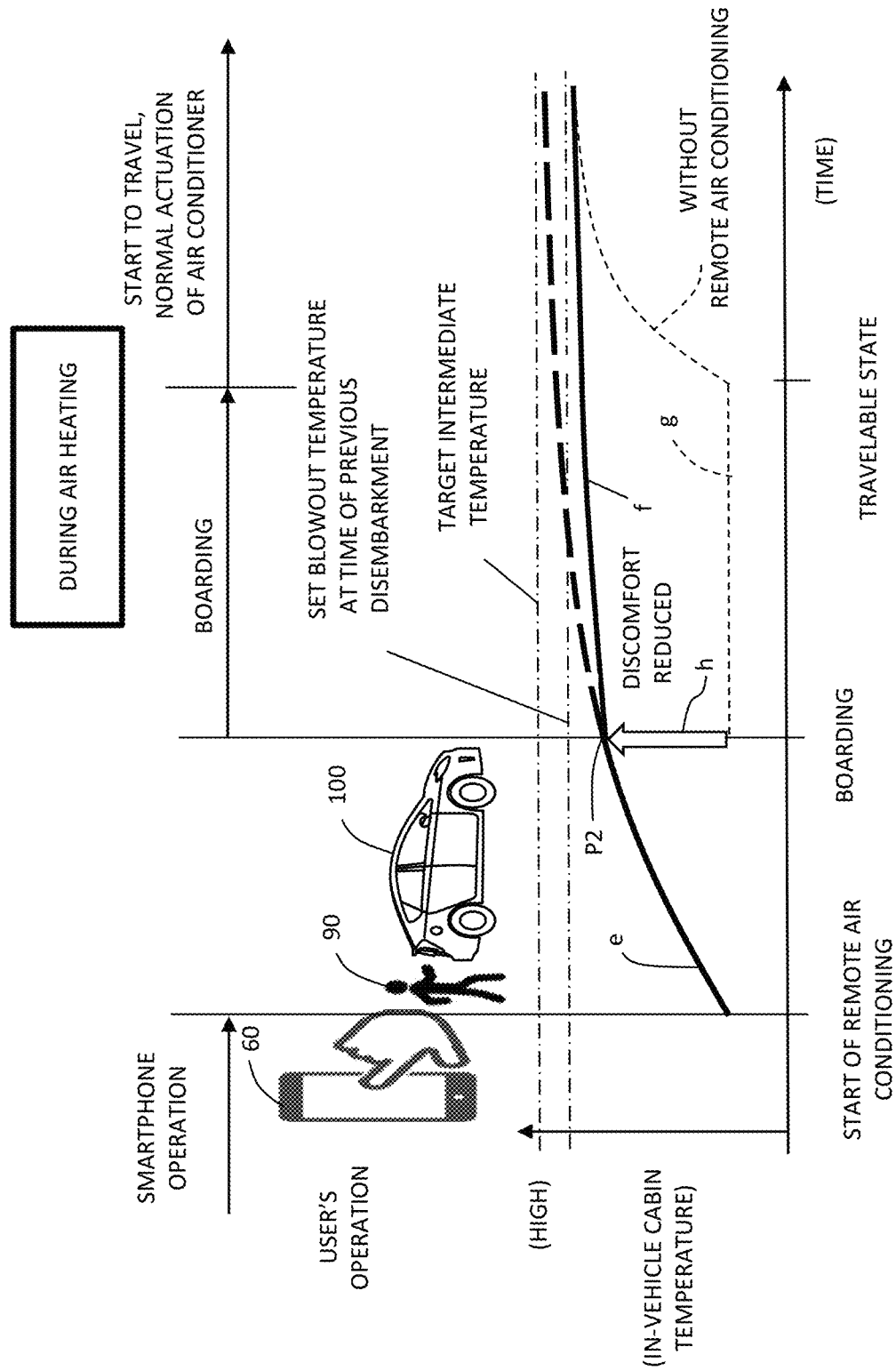
FIG. 4 is a diagram showing an effect of remote air conditioning during air heating according to an embodiment of the present disclosure, in a relationship between an in-vehicle cabin temperature and time.

FIG. 4 shows an effect of the remote air conditioning at the time of the air heating in the present embodiment, in a relationship between the in-vehicle cabin temperature and time. In the example case of FIG. 4, when the remote air conditioning is started by the operation of the smartphone 60 by the user 90, as shown by a solid line e in FIG. 4, the in-vehicle cabin temperature is gradually increased from a low temperature at the start, to converge toward a temperature near the target intermediate temperature. In the case in which the user 90 boards the vehicle before the in-vehicle cabin temperature reaches the temperature near the target intermediate temperature, the target blowout temperature and the target air quantity return respectively to the set blowout temperature and the set air quantity at the time of previous disembarkment. Because of this, as shown by a solid line f in FIG. 4, the in-vehicle cabin temperature changes to converge toward a temperature near the set blowout temperature at the time of previous disembarkment, and thus, the solid lines e and f indicating the in-vehicle cabin temperature form a curve having a point P2 at the time of boarding of the vehicle as a point of inflection. FIG. 4 shows a case in which, at the time of previous disembarkment, the user 90 sets the set blowout temperature to a temperature lower than a center temperature by an operation of the temperature adjustment switch 42; that is, the setting corresponds to weak air heating.

On the other hand, a broken line g in FIG. 4 shows a case in which the user 90 does not execute the remote air conditioning before boarding the vehicle. In this case, at the time of boarding of the user 90 to the vehicle, the in-vehicle cabin temperature is low, similar to the start of the remote air conditioning shown by the solid line e. Based on this, it can be understood that, when the remote air conditioning is executed, the in-vehicle cabin temperature can be increased at the time of boarding of the vehicle by a temperature difference shown by a white-filled arrow h in comparison to the case without the remote air conditioning, and the discomfort of the user 90 at the time of boarding the vehicle can thus be reduced.

The invention claimed is:

1. A control system of an air conditioner for a vehicle, the control system comprising:
   an air conditioner configured to receive instructions remotely or manually, in which a blowout temperature and an air quantity of an air-conditioning air from a blowout outlet are manually adjusted by an operation of a user interface in a vehicle cabin by a user; and
   a processor that is configured to cause the air conditioner to execute remote air conditioning in response to a command from outside of the vehicle in a state in which the user is not boarding the vehicle, wherein
   the processor is configured to
      start actuation of the air conditioner with (i) a maximum temperature which is a maximum highest temperature capacity of the control system during a heating operation or a maximum lowest temperature capacity of the system during a cooling operation as a target blowout temperature of the air-conditioning air and (ii) a maximum air quantity as a target air quantity of the air-conditioning air in response to a trigger command of the remote air conditioning,
      gradually change and reduce the target air quantity while gradually changing the target blowout temperature toward a target intermediate temperature with elapse of time, the target intermediate temperature being a predetermined temperature lower than the maximum highest temperature capacity of the control system during the heating operation and higher than the maximum lowest temperature capacity of the system during the cooling operation, and
      change the target blowout temperature and the target air quantity respectively to a set blowout temperature and a set air quantity at a time of previous disembarkment, when boarding of the user to the vehicle is detected.

2. The control system of the air conditioner for the vehicle according to claim 1, wherein
   the processor is configured to change degrees of gradual changes of the target blowout temperature and the target air quantity during the remote air conditioning according to a detection value of at least one sensor of an outside air temperature sensor, or a solar radiation sensor which detects an intensity of solar radiation in the vehicle cabin.

\* \* \* \* \*